United States Patent Office 2,734,854
Patented Feb. 14, 1956

2,734,854
PURIFICATION AND RECOVERY OF MALEIC ANHYDRIDE

Joseph Nils Ospenson, Concord, Calif., assignor to California Spray-Chemical Corporation, Richmond, Calif., a corporation of Delaware No Drawing. Application February 23, 1954,
Serial No. 412,070

5 Claims. (Cl. 202—42)

This invention relates to the recovery of maleic acid anhydride, hereinafter referred to as "maleic anhydride," from crude or impure maleic anhydride and particularly a crude maleic anhydride containing color body impurities and associated compounds.

Numerous oxidation processes are known and have been employed whereby maleic anhydride may be produced as a primary or secondary product from the vapor phase catalytic oxidation of aromatic compounds such as benzene, toluene, xylene, naphthalene and their derivatives. The yield of maleic anhydride is dependent largely upon the choice of the charge stock to be oxidized. In all of the oxidation processes a variety of incidental oxidation products are formed and are so closely associated with the maleic anhydride as to render the separation thereof extremely difficult.

Of particular concern in the separation and recovery of maleic anhydride from the products of oxidation is the presence of color bodies which are tenacious in their association with the maleic anhydride. The difficulties in the recovery of pure maleic anhydride from the oxidation products are greatly accentuated where the maleic anhydride is a secondary or by-product such as in the production of phthalic anhydride by catalytic oxidation of ortho xylene or naphthalene. In these processes, the bulk of the primary product, namely, phthalic anhydride, is stripped and recovered from the oxidation product by conventional recovery means. Irrespective of the mode of recovery of the primary product, the residual product, containing maleic anhydride or maleic acid as the dominant component, contains a full complement of associated oxidation products and color body impurities.

The various methods of separating and recovering maleic anhydride heretofore employed involved lengthy processing or a sacrifice in yield of maleic anhydride. When operating with an aqueous recovery system, the maleic acid is first concentrated and then dehydrated to maleic anhydride. At this point, the crude maleic anhydride is subjected to a variety of processes in which the objective is to convert or alter the associated oxidation products and color bodies to by-products whose volatility differs substantially from maleic anhydride and thereby facilitates the separation of the maleic anhydride by solvent extraction or vacuum distillation. The amount of processing necessary to prepare the crude maleic anhydride for recovery and purification is dependent to a large extent upon the relative proportion of associated oxidation products and color bodies which is quite appreciable in by-product maleic anhydride.

According to the present invention, a process has been developed whereby substantially pure maleic anhydride may be recovered in a single-stage operation from a crude maleic anhydride mass containing varying proportions of associated oxidation products and color body impurities. This process may be employed as the primary recovery system in an oxidation process directed to the production of maleic anhydride or it may be used as a supplementary recovery process for the separation of maleic anhydride from residual or by-product streams.

It has been discovered that maleic anhydride may be recovered from a crude maleic anhydride mass, containing associated compounds and color body impurities, by contacting the crude maleic anhydride with an inert organic liquid which forms a constant-boiling mixture with maleic anhydride and distilling the azeotrope of the organic liquid and maleic anhydride to effect a separation of the maleic anhydride from the residual oxidation products and color bodies. The recovery of substantially pure maleic anhydride from the resulting distillate is accomplished with ease by either cooling, phase separation, dilution or extraction, depending upon the characteristics of the organic liquid and its maleic anhydride azeotrope. With this type of recovery system, it is possible to extract substantially quantitatively maleic anhydride from a crude oxidation product with a minimum entrainment of associated compounds and color body impurities. Additionally, the process is adaptable to continuous operation wherein the azeotroping liquid is recycled through the system and the residual impurities are periodically bled from the still bottoms.

In general, the type of inert organic liquid preferred for this azeotropic recovery process is one which forms a negative azeotrope with maleic anhydride, e. g., a minimum constant-boiling mixture, and possesses a moderate solvent power for maleic anhydride so as to form a homogeneous azeotrope with a high distillation rate of maleic anhydride. Certain advantages may be attendant the use of a heterogeneous azeotroping liquid which would allow a simple phase separation of the distillate to recover the maleic anhydride but, irrespective of the type of phase system, it is desirable to employ an azeotroping liquid or solvent which possesses a boiling point deviation from the boiling point of maleic anhydride of from 5 to 50° C. When employing a negative azeotroping liquid or solvent, it is also preferable to select an entrainer which forms a constant-boiling mixture with maleic anhydride in the range of 135–190° C. so as to provide a practical balance between efficiency of separation from the associated oxidation products and an excessive volume carry-over of the azeotroping liquid. Thus, as a general proposition, the lower the boiling point of the azeotrope, the higher the efficiency of separation and, conversely, the higher the boiling point of the azeotrope as it approaches the boiling point of maleic anhydride, the greater the volume concentration of the maleic anhydride in the azeotrope.

Although the efficiency of separation and recovery of maleic anhydride, according to the subject process, when conducted at substantially atmospheric pressure, is a marked improvement over the conventional vacuum distillation, it is to be understood that operating pressures are not critical to this process. Thus, where decomposition may be a factor in the recovery process, the azeotropic distillation may be conducted at reduced pressures to further depress the distillation temperatures of the system. In that case, the specifications of azeotropic distillation hereinbefore set forth as of atmospheric pressure should be extrapolated to the desired working pressure.

One of the particularly outstanding organic solvents which forms a minimum constant-boiling mixture with maleic anhydride is orthodichlorobenzene. This compound possesses a boiling point of 180–183° C. and forms an azeotrope with maleic anhydride at a vapor temperature of 170–172° C. at one atmosphere pressure. It has been found that orthodichlorobenzene is well suited to the recovery of maleic anhydride from associated oxidation products and color body impurities by reason of a combination of desirable features. The azeotropic distillation with orthodichlorobenzene allows a substantial distillation rate of maleic anhydride per volume of entrainer of the order of 300 grams of maleic anhydride per liter of orthodichlorobenzene. Additionally, the solubility-temperature curve of maleic anhydride in orthodichlorobenzene approaches a perpendicular straight-line function within the range of 10–50° C., which allows a substantial recovery of crystalline maleic anhydride solely by cooling and filtering within this range. Maleic anhydride is completely miscible with the entrainer solvent at 45–50° C., whereas at 10° C. the solubility threshold is approximately 5 percent.

Generally, it has been found that with azeotroping liquids with a high degree of solvent power for the maleic anhydride, a stable solution is formed in the distillate which requires extraction, dilution or substantial refrigeration to recover the maleic anhydride; whereas with liquids of very low solubility the maleic anhydride is deposited from the distillate in hard lumps which may have to be reworked to yield the desired crystalline form.

When operating the subject recovery system with orthodichlorobenzene as the entrainer, it is desirable to employ an amount of orthodichlorobenzene equivalent to at least three times the weight concentration of maleic anhydride in the crude mass to be fractionated. An efficient separation requires a concentration of entrainer in contact with the crude maleic anhydride which exceeds the entrainer concentration in the azeotrope composition. In the case of the maleic anhydride-orthodichlorobenzene azeotrope composition, it has been determined that the azeotrope contains approximately 23 weight percent maleic anhydride and 77 weight percent of orthodichlorobenzene.

The subject recovery process, employing orthodichlorobenzene as the entrainer solvent, has been conducted on numerous compositions in which maleic anhydride is associated with one or more close-boiling components and which are representative of certain crude and by-product maleic anhydride compositions. In all instances, it was possible to extract substantially quantitatively the maleic anhydride component of the charge and recover the maleic anhydride in the form of pure white needles with melting points in the range of 52–60° C.

Representative of a by-product source of maleic anhydride containing associated oxidation products and color body impurities was a maleic acid bleed stream taken from a phthalic acid recovery system from the oxidation of xylenes. This bleed stream contained 7.4 weight percent of maleic acid, 1.1 percent phthalic acid, and 1.7 percent of associated solids. This dilute solution of maleic acid was concentrated to about 30 to 40 percent by weight of maleic acid and subjected to dehydration by codistillation with xylene. The resulting anhydrous mass was then slurried with an excess volume of orthodichlorobenzene and introduced into an efficient distillation column. The distillation proceeded at a constant vapor temperature of approximately 170–172° C. until all of the maleic anhydride was removed from the pot solution. The recovered distillate was then cooled to precipitate the major portion of the maleic anhydride in the form of white crystalline needles. Further recovery of the residual solution of maleic anhydride in orthodichlorobenzene was attained by dilution. The yield of pure maleic anhydride from the anhydrous mass was substantially quantitative, and the color of the white crystalline products remained stable even after prolonged storage under atmospheric conditions.

Obviously, many modifications and variations of the invention, as hereinbefore set forth, may be made without departing from the spirit and scope thereof, and therefore only such limitations should be imposed as are indicated in the appended claims.

I claim:

1. The method of recovering maleic anhydride from impurities and associated compounds which comprises introducing to a body of impure maleic anhydride an inert organic solvent, possessing a boiling point within 10 to 50° C. from the boiling point of maleic anhydride and capable of forming a minimum constant-boiling mixture with said maleic anhydride within the range of 135–190° C., distilling the azeotrope of said organic solvent and maleic anhydride and recovering substantially pure maleic anhydride from the effluent distillate.

2. A method of recovering maleic anhydride from impurities and associated compounds which comprises continuously introducing to a body of impure maleic anhydride an organic liquid, chemically inert to said maleic anhydride and possessing the characteristic of forming a constant-boiling mixture with said maleic anhydride within the range of 135–190° C., continuously distilling the azeotrope of said organic liquid and maleic anhydride, recovering substantially pure maleic anhydride from the effluent distillate and recycling the said organic liquid to further contact with impure maleic anhydride.

3. The method of recovering maleic anhydride from impurities and associated compounds which comprises introducing orthodichlorobenzene to a body of impure maleic anhydride, distilling the azeotrope of orthodichlorobenzene and maleic anhydride at its constant-boiling temperature and recovering substantially pure maleic anhydride from the effluent distillate.

4. The method of recovering maleic anhydride from impurities and associated compounds which comprises introducing orthodichlorobenzene to a body of impure maleic anhydride, distilling the azeotrope of orthodichlorobenzene and maleic anhydride at its constant-boiling temperature and cooling the effluent distillate to precipitate crystalline maleic anhydride.

5. A continuous method of recovering maleic anhydride from impurities and associated compounds which comprises continuously introducing orthodichlorobenzene into a body of impure maleic anhydride, distilling the azeotrope of orthodichlorobenzene and maleic anhydride at its constant-boiling temperature, recovering substantially pure maleic anhydride from the effluent distillate and recycling orthodichlorobenzene for further distillation with impure maleic anhydride.

References Cited in the file of this patent

UNITED STATES PATENTS

| Number | Name | Date |
|---|---|---|
| 1,424,138 | Bailey et al. | July 25, 1922 |
| 1,912,628 | Elliott | June 6, 1933 |
| 2,140,140 | Punnett | Dec. 13, 1938 |
| 2,308,588 | Crowell | Jan. 19, 1943 |
| 2,462,444 | Weiss | Feb. 22, 1949 |
| 2,683,110 | Rousseau | July 6, 1954 |

FOREIGN PATENTS

| Number | Country | Date |
|---|---|---|
| 415,748 | Great Britain | Aug. 27, 1934 |